(12) United States Patent
Sutehall et al.

(10) Patent No.: US 7,783,147 B2
(45) Date of Patent: Aug. 24, 2010

(54) OPTICAL FIBRE DROP CABLES

(75) Inventors: Ralph Sutehall, Newport (GB); Martin Vincent Davies, Newport (GB)

(73) Assignee: Prysmian Cables & Systems Limited, Hampshire (GB)

( * ) Notice: Subject to any disclaimer, the term of this patent is extended or adjusted under 35 U.S.C. 154(b) by 0 days.

(21) Appl. No.: 10/495,990

(22) PCT Filed: Nov. 15, 2002

(86) PCT No.: PCT/GB02/05144

§ 371 (c)(1),
(2), (4) Date: May 19, 2004

(87) PCT Pub. No.: WO03/044583

PCT Pub. Date: May 30, 2003

(65) Prior Publication Data

US 2005/0002623 A1    Jan. 6, 2005

(30) Foreign Application Priority Data

Nov. 19, 2001    (EP) ................... 01309742

(51) Int. Cl.
G02B 6/44    (2006.01)
(52) U.S. Cl. ...................... 385/101; 385/104
(58) Field of Classification Search .......... 385/100–114
See application file for complete search history.

(56) References Cited

U.S. PATENT DOCUMENTS

| 4,574,192 | A | * | 3/1986 | Kitagawa et al. | ........ 250/227.14 |
| 4,575,184 | A | | 3/1986 | Ueno et al. | |
| 4,859,024 | A | * | 8/1989 | Rahman | ............ 385/112 |
| 4,952,021 | A | | 8/1990 | Aoki et al. | |
| 5,189,718 | A | | 2/1993 | Barrett et al. | |
| 5,267,338 | A | * | 11/1993 | Bullock et al. | ............ 385/100 |
| 5,268,971 | A | * | 12/1993 | Nilsson et al. | ............ 385/101 |
| 5,469,523 | A | | 11/1995 | Blew et al. | |
| 5,917,977 | A | * | 6/1999 | Barrett | ............ 385/101 |
| 6,057,018 | A | * | 5/2000 | Schmidt | ............ 428/36.9 |
| 6,236,789 | B1 | | 5/2001 | Fitz | |
| 6,321,012 | B1 | * | 11/2001 | Shen | ............ 385/106 |
| 2002/0071644 | A1 | * | 6/2002 | Nakajima | ............ 385/101 |

FOREIGN PATENT DOCUMENTS

| DE | 30 37 289 A1 | 4/1982 |
| DE | 35 22 694 A1 | 1/1987 |
| EP | 0 108 590 A1 | 5/1984 |

(Continued)

OTHER PUBLICATIONS

"Blown Fibre Structured Cabling System"; Bloite/Blotwist, BICC Brand-Rex, pp. 1-18, (1999).

*Primary Examiner*—Omar Rojas
(74) *Attorney, Agent, or Firm*—Finnegan, Henderson, Farabow, Garrett & Dunner, L.L.P.

(57) ABSTRACT

An optical fiber drop cable for suspension installation includes electrical conductors and at least one optical fiber. An electrically non-conductive reinforcing sleeve houses the conductors and the or each optical fiber. The reinforcing sleeve is housed in sheathing. In addition to or instead of the optical fiber or optical fibers, the reinforcing sleeve may house one or more elongate containers, preferably plastic tubes, for housing optical fibers.

20 Claims, 4 Drawing Sheets

FOREIGN PATENT DOCUMENTS

| | | |
|---|---|---|
| EP | 0 311 751 A2 | 4/1989 |
| EP | 0 345 968 A2 | 12/1989 |
| EP | 0 410 735 A2 | 1/1991 |
| EP | 0 521 710 A1 | 1/1993 |
| EP | 0 646 818 A1 | 4/1995 |
| EP | 0 780 713 A1 | 6/1997 |
| EP | 0 969 302 A1 | 1/2000 |
| FR | 2 543 729 | 10/1984 |
| GB | 2 104 304 A | 3/1983 |
| GB | 2 165 690 A | 4/1986 |
| GB | 2 180 666 A | 4/1987 |
| GB | 2 245 769 A | 1/1992 |
| GB | 2268814 A * | 1/1994 |
| GB | 2 270 992 A | 3/1994 |
| WO | WO 90/07138 | 6/1990 |
| WO | WO 03/044584 A1 | 5/2003 |

* cited by examiner

OPTICAL FIBRE DROP CABLES

CROSS REFERENCE TO RELATED APPLICATIONS

This application is a national phase application based on PCT/GB02/05144, filed Nov. 15, 2002, the content of which is incorporated herein by reference, and claims the priority of European Patent Application. 01309742.3, filed Nov. 19, 2001.

BACKGROUND OF THE INVENTION

1. Field of the Invention

The invention relates to optical fibre drop cables for use in telecommunications systems and particularly, but not exclusively, to such cables for use in connecting between a customer's premises and a connection point common to a number of such customers.

2. Description of the Related Art

In the field of telecommunications networks, typically cables run from an exchange to a cabinet mounted at street level and from this cabinet cables are led to a customer's premises, usually by way of an aerial, or suspension, installation comprising a cable suspended from poles or surrounding buildings in catenary. These aerially suspended cables leading to the customer premises are known as the final drop wire Historically a final drop wire has typically comprised a number of insulated conducting wires contained in a sheath. More recently the development of optical fibres has made it desirable to replace the conducting wires in drop wires with optical fibres since the latter can transmit significantly more data. However, it is also desirable that the drop wire should carry an electrical supply in order that a telephone connected to the drop wire can be used in emergency situations when the mains electrical supply to the premises in which the telephone is located has been interrupted. For this reason, it is desirable for a drop wire to include one or more optical fibres and a pair of insulated copper conductor wires.

The applicant's application GB-A-2270992 discloses a cable containing electrical conductors and optical fibres. The cable comprises electrical power conductors for conveying mains voltage electrical supplies, a plurality of optical fibres and sheathing for the conductors and optical fibres. The sheathing is in the form of a figure of eight and defines two separate chambers; one for the electrical conductors and the other for the optical fibres. However, this cable is intended for underground routing and not for suspension installation. Furthermore, it is not suitable for conducting a relatively low voltage electrical supply for powering a telephone or for use as a final drop wire.

SUMMARY OF THE INVENTION

An aspect of the invention relates to an optical fibre drop cable for suspension installation, said cable comprising electrical conductors, at least one elongate container for optical fibres and/or at least one optical fibre, an electrically non-conductive reinforcing sleeve housing said conductors and the or each said elongate container and/or optical fibre, and sheathing for said reinforcing sleeve.

Another aspect of the invention relates to an optical fibre drop cable for suspension installation, said cable comprising electrical conductors, at least one elongate container for optical fibres, an electrically non-conductive reinforcing sleeve housing said conductors and the or each said elongate container, and sheathing for said reinforcing sleeve.

Another aspect of the invention relates to an optical fibre drop cable for suspension installation, said cable comprising electrical conductors, at least one optical fibre, an electrically non-conducting reinforcing sleeve housing said conductors and the or each optical fibre, and sheathing for said reinforcing sleeve.

BRIEF DESCRIPTION OF THE DRAWINGS

In order that the invention may be well understood, some embodiments thereof will now be described with reference to the drawings, in which.

DETAILED DESCRIPTION OF THE INVENTION

Figure 1:
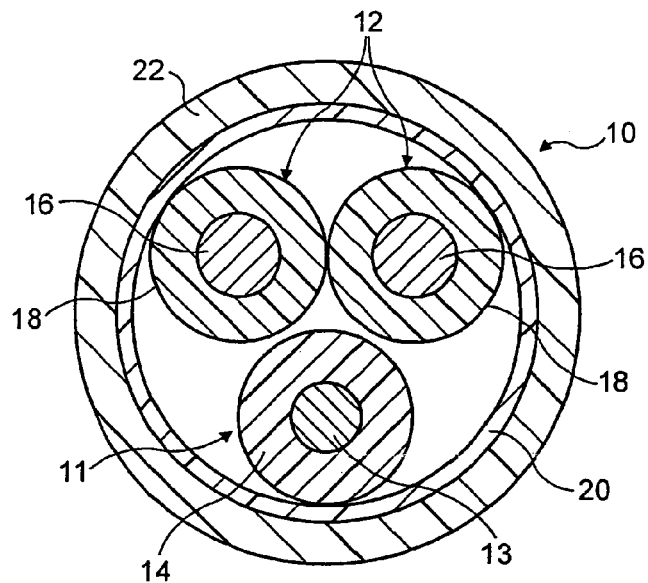
FIG. 1 is a schematic cross-section of an optical fibre drop cable comprising an optical fibre and electrical conductors.

FIG. 1 shows an optical fibre drop cable 10 containing a buffered optical fibre 11 and two insulated electrical conductors 12. The optical fibre 11 and the insulated conductors 12 are preferably stranded around one another producing a cable with a positive excess of optical fibre.

The buffered optical fibre 11 comprises an optical fibre 13 and a plastics coating 14 that protects the surface of the fibre 13 from scratching and abrasion. The plastics coating may for example be a nylon coating and the fibre with coating will typically have a diameter of approximately 1 mm. The insulated conductors 12 comprise single core copper wires 16 encapsulated in a colour-coded electrical insulating coating 13, which may be of any suitable material as will be well known to those skilled in the art. Typically, the copper wires will have a diameter of 0.4 mm and the outside diameter of the insulating coating will typically be 1.2 mm. One insulated conductor 12 is to serve as the live wire and the other as a neutral/earth wire in a circuit that will typically carry 9 to 12 volts for powering a telephone connected with the cable. It is to be understood that copper wires are given only as an example and that any suitable conducting material, such as aluminium, could be used instead.

The optical fibre 11 and insulated conductors 12 are housed in an electrically non-conductive reinforcing sleeve 20. The sleeve 20 is intended primarily to provide the cable with sufficient stiffness to permit aerial use, for example, when the cable is suspended from the tops of poles or other aerial mounting points. Preferably the reinforcing sleeve comprises strands of an aramid fibre wrapped around the optical fibre and electrical conductors. Even more preferably, the strands of aramid fibre are helically wound around the optical fibre and conductors from two directions—a so called SZ winding. One suitable aramid fibre for the sleeve 20 is Kevlar™. An alternative would be to make the reinforcing sleeve of a glass yarn.

The reinforcing sleeve 20 is encapsulated in sheathing 22, that may be made of polyethylene, MDPE, HDPE, or any other suitable sheathing material. The diameter of the optical fibre cable would typically be in the region of 6 mm.

Figure 2:
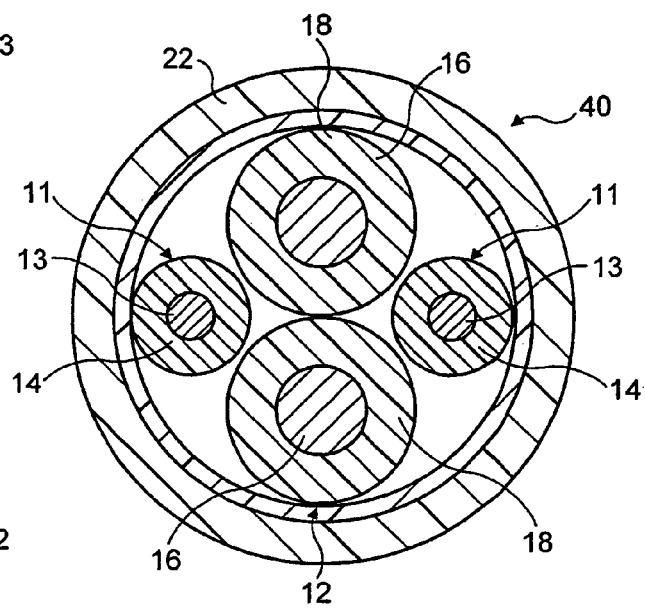
FIG. 2 is a schematic cross-section of an optical fibre drop cable comprising a plurality of optical fibres and electrical conductors.

The optical fibre drop cable 40 shown in FIG. 2 differs from the cable 10 in that it has two optical fibres 11. Again, the optical fibres 11 and the insulated conductors 12 are preferably stranded around one another to provide a cable having a positive excess of optical fibre.

Figure 3:
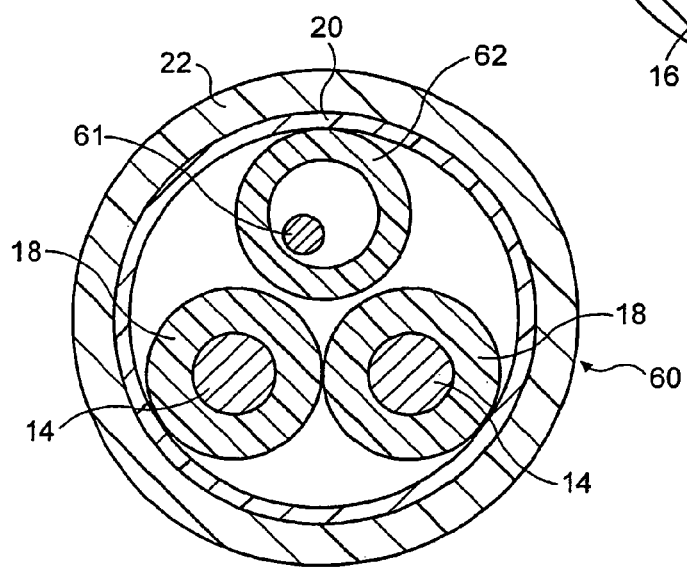
FIG. 3 is a schematic cross-section of an optical fibre drop cable comprising an optical fibre and electrical conductors.

FIG. 3 shows an optical fibre drop cable 60 that differs from the cable 10 in that an optical fibre 61 is housed in a hollow plastic tube 62. This tube may contain more than one optical fibre although only one is shown in the drawing.

It is preferred that the electrical conductors and the tube are stranded resulting in a cable with fibre strain relief.

A further option (not shown) comprises modifying the optical fibre drop cable 60 shown in FIG. 3 by omitting the optical fibre(s) 61 from the tube 62. In this case, one or more fibres 61 are blown into the tube after installation of the optical fibre drop cable. Optical fibres to be installed by blown fibre methods may, for example, take the form disclosed in EP-A-0345968, EP-A-0521710 or EP-A-0646818 and may be introduced into the tube 62 by known blowing processes such as the process described in EP-A-0108590. For blown fibre installation the tube 62 may be made of polyethylene with a carbon loaded radially inner surface to increase conductivity, as disclosed in U.S. Pat. No. 4,952,021. Blown fibre installation has the advantage that the optical fibre(s) are not subjected to the stresses that arise during suspension of the cable.

Figure 4:
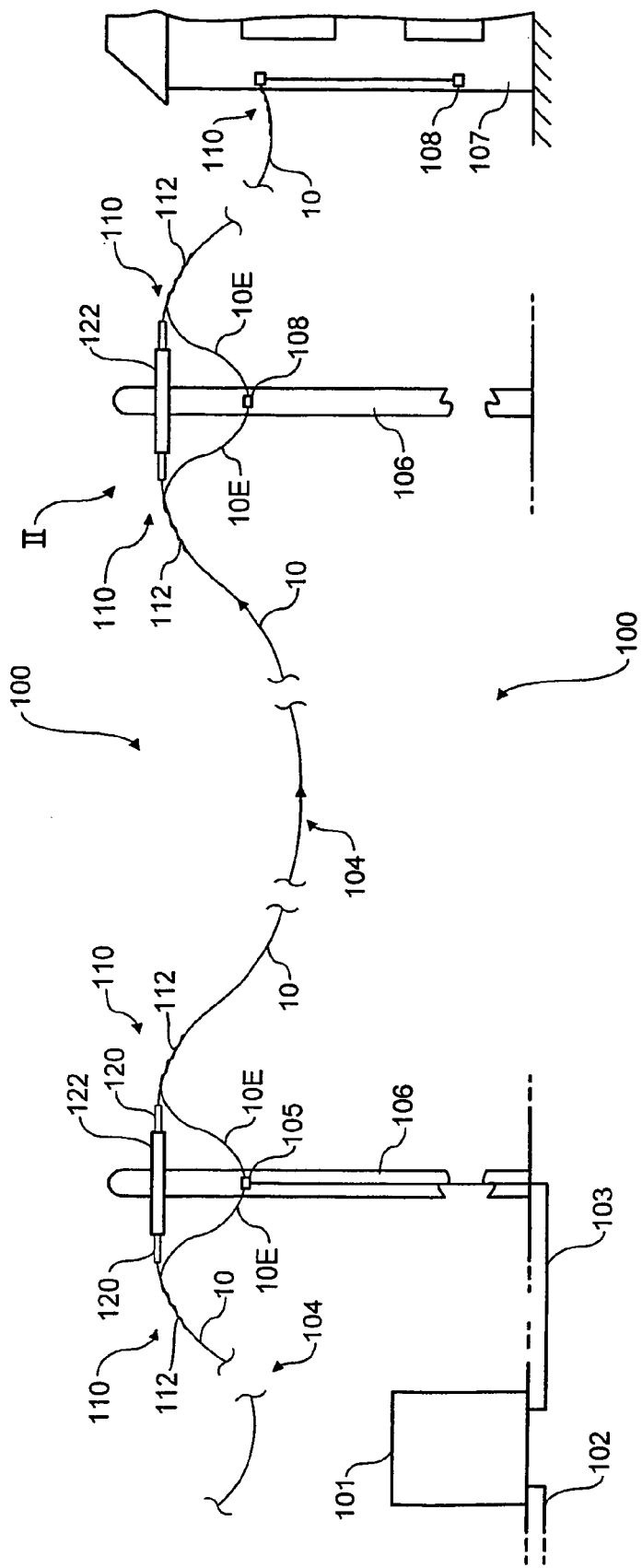
FIG. 4 is a schematic representation of a drop installation including a cable as shown in FIG. 1, 2 or 3.

FIG. 4 shows a drop installation 100 comprising any of the optical fibre drop cables 10, 40 or 60. For ease of description, reference will now be made only to the installation comprising the optical fibre drop cable 10.

The installation 100 includes a housing 101 containing a distribution arrangement for distributing connections to telecommunications lines that are to run to customer premises. The housing is fed from an exchange by means of a multifibre optical cable 102 such as a known 48 fibre underground cable.

A multifibre optical cable 103 comprising sufficient fibres for connecting with ten telecommunications lines 104 (ten fibres for single fibre circuits or twenty fibres for twin fibre circuits), leads from the housing 101 to a connecting box, or manifold 105 on an adjacent pole 106. In addition the reference numeral 103 indicates electrical conductors for conducting a voltage of 9 to 12 volts to the manifold 105.

A telecommunications line 104 runs from the manifold 105 to customer premises such as a building 107, in the drawing, two telecommunications lines 104 are shown, one extending to the right of the manifold and leading to the building 107 and the other extending to the left of the manifold. As mentioned above, the optical fibre cable 103 contains sufficient optical fibres to connect with ten telecommunications lines 104 and thus there may be ten separate telecommunications lines extending from the manifold 105.

The telecommunications lines 104 each comprise a plurality of lengths of the optical fibre drop cable 10 extending from the manifold 105 and connected end-to-end at respective connecting boxes 108 mounted on poles 106 and the building 107. The lengths of cable 10 are connected to the poles 106 by securing devices 110. In the drawing, only two poles are shown, but in practice there will be as many poles as are required to support the cable en route between the manifold 105 and the customer premises. Typically the spacing between the poles is approximately 200 feet (61 metres), although it may be up to 100 m.

Figure 5:
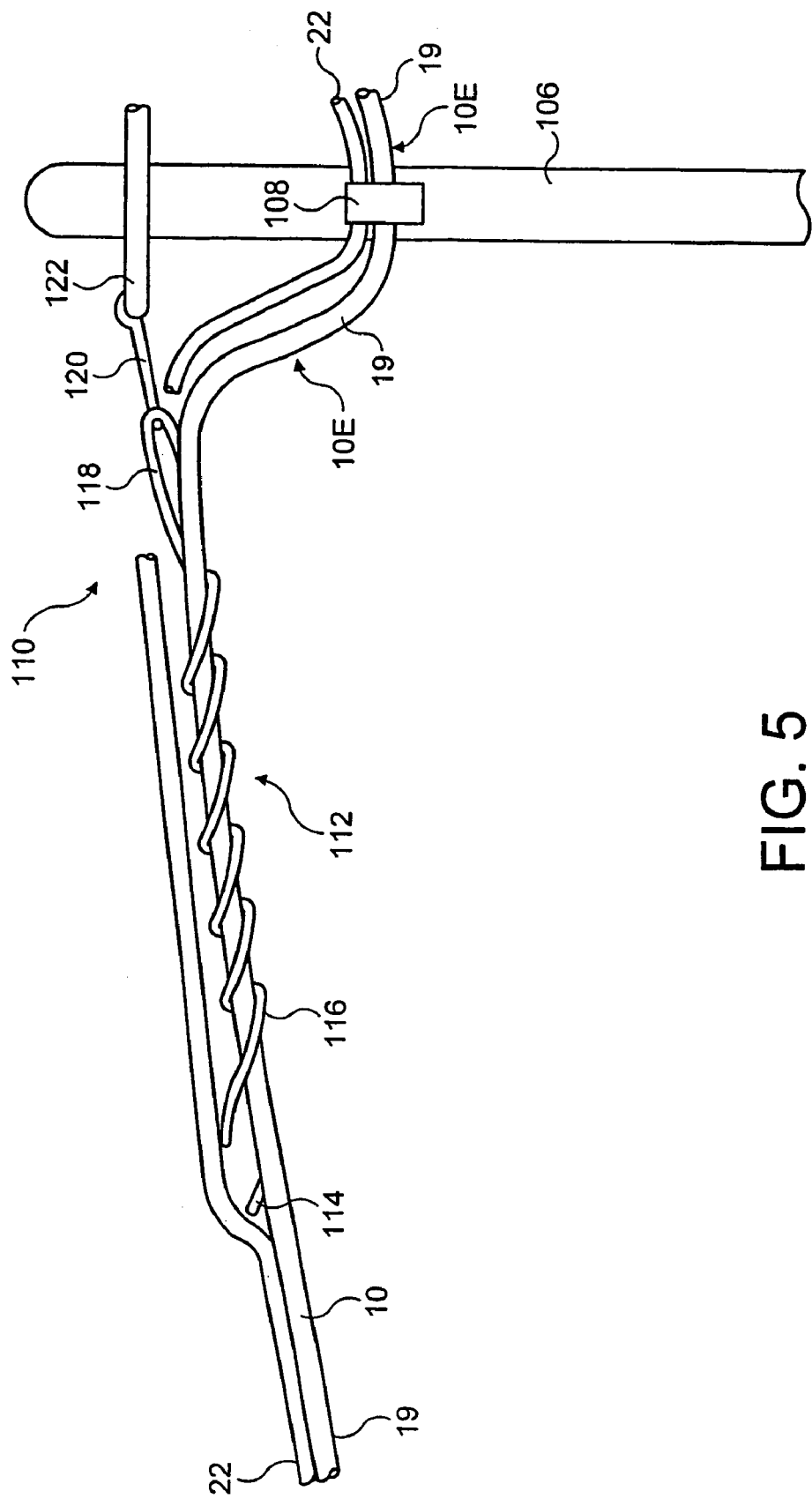
FIG. 5 is an enlargement of a portion of FIG. 4.

As best seen in FIG. 5, each securing device 110 comprises an elongate member 112 which is bent double to define two end portions 114, 116 that are helically wrapped around the cable in the same sense, and a bend, or loop, 118 that connects the end portions. The securing device 110 additionally comprises a tensile connecting member 120 having hooked end portions, one of which engages the loop 118 and the other of which engages a pole ring 122 fixed to the pole 106. The tensile connecting member 120 may include means (not shown) for adjusting tension in the cable 10 between the securing devices on adjacent poles 106. In this case, the tensile connecting member may comprise two portions each having threading at their ends remote from the hooked end portions and interconnected by a nut such that rotation of the nut causes lengthening or shortening of the tensile connecting member.

Figure 6:
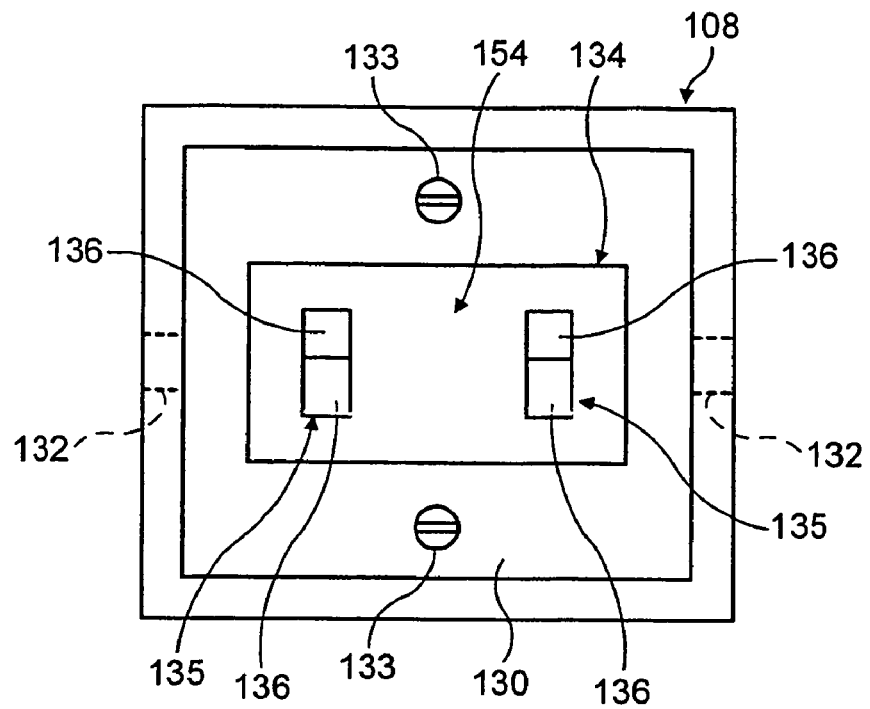
FIG. 6 is a schematic representation of a connecting box of the installation of FIG. 4.

As shown schematically in FIG. 6, a connecting box 108 has a hollow interior 130, that can be accessed by removing a cover plate (not shown). An opening 132 for a cable 10 is provided at each side of the box to serve as an entry point for an end of a cable 10. The connecting boxes 108 are secured to the poles 106 by any suitable means, such as screws 133. Each box contains a push-fit connector arrangement, or device, 134 by means of which the ends of the cables 10 are secured within the box. The push-fit connector arrangement 134 may utilise any suitable known push-fit technology and has two push-fit connection points 135 at spaced apart positions, one for each cable end.

Figure 7:
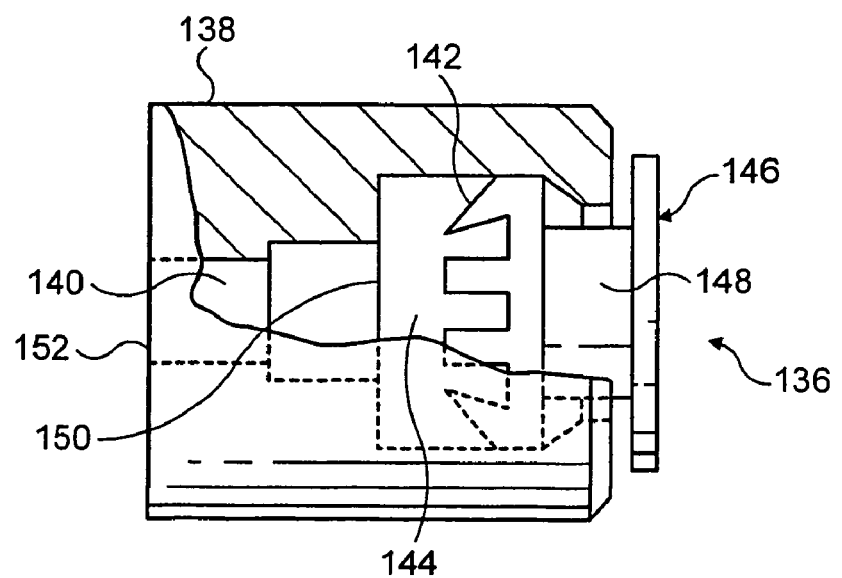
FIG. 7 shows a push-fit connector arrangement included in the connecting box.

The push-fit connection points 135 may include a push-fit connector 136 as shown in FIG. 7. The push-fit connector 136 comprises a body 138 that defines a stepped through-passage 140. A gripping means 142 that comprises a ring having a plurality of circumferentially spaced apart radially and axially inwardly extending projections, or barbs, is housed in a larger diameter portion 144 of the through-passage 140 at a position remote from the ends of the through-passage. The gripping means 142 is preferably made of metal, but may be made of a plastics material. The barbs are able to deflect radially outwardly on insertion of an end of a cable 10 into the through-passage 140 (from the right as viewed in the drawing), but dig into the cable if the cable is pulled in the direction opposite to the direction of insertion so as to resist subsequent withdrawal of the cable from the connection point 136. A collet 146 may be provided to permit withdrawal of the cable should it become desirable to break the connection. The collet 146 has a cylindrical leading-end portion 148 which projects into the through-passage 140 and is engageable with the barbs on axial inward movement relative to the gripping means 142 to deflect the barbs radially outwardly to release the grip on the cable and permit its withdrawal.

To form a connection between adjacent ends of the lengths of cables 10, the respective ends of the cables are fed through the openings 132 into the hollow interior of a connecting box 108. The sheathing 22 and the reinforcing sleeve 20 are stripped back to expose the insulated conductors 12 and buffered optical fibre 11 and then the cable ends are push-fitted into the respective push-fit connectors 136 at the connection points 135 until the cut end of the sheathing and reinforcing sleeve abuts a shoulder 150 defined by the through-passage 140. At this stage, the ends of the cables are secured in the push-fit connectors by the barbs of the gripping means 142, and the exposed optical fibre 11 and insulated conductors 12 protrude from the inner ends 152 of the through-passages to a connection region 154 of the connecting box. Here the respective electrical conductors 16 and the optical fibre 13 of the opposed cable ends are connected by any suitable conventional means. For example, the conductors 12 may be connected by stripping back the insulating coating to expose the conductors 16 and twisting the ends of the wires together. Alternatively a terminal block in which the ends of conductors are secured by means of screws may be used.

The manifold 105 may be of similar construction to a connecting box 108. The manifold 105 would contain an additional opening through which the optical fibre cable 103 is fed and ten openings 132 to permit ten telecommunications lines 104 to feed from the manifold. The ends of the telecommunications lines 104 can be secured in the manifold 105 by means of push-fit connectors, such as the push-fit connectors 136, in the same way as in the connecting boxes 108, or by any other suitable means. The optical fibre 103 may be connected to the manifold 105 by any suitable conventional means and similarly, connections between the electrical conductors and the optical fibres of the optical cable 103 may be made with the electrical conductors 12 and optical fibres 11 by any suitable conventional means.

As shown in FIG. 4, the lengths of optical fibre drop cable 10 suspended between the poles 108 are connected to the poles by the securing devices 110, which are secured to the cable at spaced apart positions remote from its ends. The tension in the cable suspended between the poles can be adjusted after suspension of the cable by means of the adjusting means of the tensile connecting members 120 if such means are provided. The end portions 10E of the cable (FIG. 5) between the securing devices 110 and the connecting box 108 are untensioned.

The helical winding of the ends 114, 116 of the elongate member 112 can be adapted such that it will grip the optical fibre cable 10 with a predetermined force so that the cable will slip when the tension in the cable reaches or exceeds a predetermined level. Once the cable slips, the previously untensioned portions 10E of the cable will be tensioned and the push-fit connectors 136 are arranged such that the cable will be released, breaking the connection with the adjacent lengths of cable when the tension in the portion 10E reaches a second predetermined level which is no greater than the tension load that causes the slippage of the cable and is preferably substantially less. The tension load at which the elongate member 112 permits slippage of the cable is selected such that the cable will slip at a loading less than that required to break the cable. It is expected that the strength of the cable would be such that it would break under a tensile load in the region of 2 KN, that the elongate member 112 would be arranged to permit slippage of the cable under a load in the region of 1.2 to 1.5 KN and the push-fit connectors would be arranged to permit the cable connections to break at a load in the region of 170N, although it is to be understood that these loads are given as examples and should not be taken as limiting.

In the drop installation 100, the ends 10E of the optical fibre drop cable are described as being secured to the connecting box 108 by means of a push-fit arrangement, it will be appreciated that this arrangement whilst advantageous in terms of simplicity and ease of fitting should not be taken as limiting. The ends 10E may be secured by any suitable means, such as a spring-loaded cable clamp that will provide sufficient security to hold the ends 10E in place and avoid any tensile load being transmitted to the joints between the optical fibres 11 and conductors 12 during normal operating conditions and at the same time reliably permit breakage of the connection at a tensile loading no greater than that required to cause slippage of the cable through the securing devices 110.

If the telecommunications line 104 is to be constructed using an optical fibre drop cable 60 as shown in FIG. 3, with the optical fibre(s) being installed by blown fibre techniques, it is necessary to provide a substantially gas-tight passage along which the optical fibres are to be blown. In this case, the sheathing 22 and reinforcing sleeve can be cut back such that when the cable end 10E is push-fitted into a push-fit connection point 135 the cut end of the plastics tube 62 protrudes from the end 152 of the through-passage 140 into the connection region 154. The ends of the tubes 62 protruding into the connection region can then be interconnected to provide a gas-tight passage for the optical fibre(s) by means of a suitable length of tubing inserted therebetween. Alternatively, means defining a passage would be provided between the push-fit connection points 135 and arranged such that the ends of the tubes 62 can be inserted therein to provide a continuous air-tight passage for the optical fibre(s).

It is to be understood that whilst the optical fibre drop cables 10, 40, 60 are described as being used in the drop installation 100, which provides for a controlled breakage of the telecommunications line, this is not essential and the cables could be used in any suitable conventional aerial installation.

Whilst it is not essential that the optical fibre drop cables 10, 40, 60 are installed in an arrangement such as the arrangement 100 that provides controlled breakage of the telecommunications line under a load less than that required to break the cable, it will be appreciated that such an arrangement is advantageous. This is because the loading which will cause the optical fibre cable to slip and the connection between adjacent ends to break can be chosen to be less than that required to break the cable, which is a useful safety feature in the event of a high vehicle driving into the telecommunications line 104 or a tree or other structure falling on it. Furthermore, since the connections between a length of the optical fibre cable and adjacent lengths in the line are broken in the event of such events, damage to the telecommunications line should be localised thereby reducing the time required for and cost of repair. In addition, since the telecommunications line can be designed to break on application of a predetermined loading, the cable can be made significantly stronger than might otherwise be the case, thereby providing greater protection for the optical fibre(s) contained in the cable. In particular, the cable can be made stiffer and thus able to better withstand the effects of variable loading due to wind force and the settling of moisture or ice formation.

An advantage of the cables of the embodiments is that by providing a non-conducting reinforcing sleeve, the electrical resistance of the cable is improved in such a way that the thickness of insulation required can be reduced allowing for a possible decrease in overall cable diameter. By way of example, the thickness of sheathing for a cable with an aramid reinforcing sleeve would be in the region of 1.5 mm, whereas if the sleeve was made of a conducting material, a minimum thickness of 2 mm would be required.

It will also be appreciated that by providing a reinforcing sleeve in the sheathing adjacent the optical fibres as opposed to the possibility of supporting the cable by way of an existing aerial installation or providing an auxiliary strengthening member external to the sheathing, the strengthening arrangement can directly control the thermal and tensile performance of the cable and provide better protection for the optical fibre(s) by virtue of its close to proximity to it/them. In this connection, it is desirable to match the thermal properties of the sleeve to the thermal properties of the optical fibre(s) to the extent that this is possible.

The substantially circular shape of the cable and relatively small diameter of the cable reduces the effect of wind loading and the effects of the settling of moisture and ice formation on the cable, and this reduces the maximum tension the cable will experience during normal operating conditions thereby reducing the amount of cable reinforcing required to permit aerial suspension. This makes it possible to provide a reduced diameter cable.

The circular shape of the cable also reduces the possibility of wind induced galloping, a phenomenon that will be familiar to those skilled in the art and is more likely to occur when a figure of eight cable is used.

The optical fibre drop cables of the embodiments are low fibre count cables intended to be used primarily in aerial installations as a final drop wire. It is envisaged that such a low fibre count cable will comprise no more than two optical fibres. Furthermore, the electrical conductors are intended to carry only a low voltage, preferably in the region of 9 to 12 volts, and only two conductors are needed for this purpose.

The invention claimed is:

1. An optical fibre drop cable, said cable consisting of electrical conductors, at least one elongate container for one or more optical fibres, an electrically non-conductive reinforcing sleeve housing said conductors and said at least one elongate container, the reinforcing sleeve comprising strands of electrically non-conductive fibres helically wound around the electrical conductors and the at least one elongate container, and sheathing for said reinforcing sleeve,
wherein said electrical conductors are not twisted pair lines and are stranded around at least one elongate container and said at least one elongate container is stranded around said electrical conductors,
wherein the reinforcing sleeve is arranged continuously along the entire length of the cable, the sheathing is applied directly on the surface of the reinforcing sleeve, and the sheathing does not contact the electrical conductors and the at least one elongate container,
and wherein said cable is an optical fibre drop cable suitable for suspension installation.

2. A cable as claimed in claim 1, wherein said at least one elongate container comprises plastics tubing.

3. A cable as claimed in claim 1, wherein said at least one elongate container contains at least one optical fibre.

4. An optical fibre drop cable, said cable consisting of electrical conductors, at least one optical fibre, an electrically non-conducting reinforcing sleeve housing said conductors and said at least one optical fibre, the reinforcing sleeve comprising strands of electrically non-conductive fibres helically wound around the electrical conductors and the at least one optical fibre, and sheathing for said reinforcing sleeve,
wherein said electrical conductors are not twisted pair lines and are stranded around the at least one optical fibre and said at least one optical fibre is stranded around said electrical conductors,
wherein the reinforcing sleeve is arranged continuously along the entire length of the cable, the sheathing is applied directly on the surface of the reinforcing sleeve, and the sheathing does not contact the electrical conductors and the at least one optical fibre
and wherein said cable is an optical fibre drop cable suitable for suspension installation.

5. A cable as claimed in claim 1, wherein said reinforcing sleeve comprises aramid fibres.

6. A cable as claimed in claim 1, comprising no more than two optical fibres.

7. A cable as claimed in claim 1, having a substantially circular cross-section.

8. A drop installation including a telecommunications line comprising an optical fibre cable as claimed in claim 1 suspended from a plurality of spaced apart aerial locations.

9. An installation as claimed in claim 8, wherein said telecommunications line comprises a plurality of lengths of said optical fibre cable connected in end-to-end relationship at said aerial locations by respective connection devices, said telecommunications line being secured to each said aerial location by respective securing devices secured to the line at two spaced apart positions such that the portion of the line between said positions is untensioned and includes a said connection device, said securing devices being arranged to permit transmission of a tensile load to a said untensioned portion of the line when a tensile load on the line adjacent thereof on either side of the aerial location reaches a first predetermined level and said connection devices being arranged to cause the end-to-end connection of the lengths of optical fibre cable connected thereby to break when the tensile load transmitted to said untensioned portion reaches a second predetermined amount that is less than a tensile load required to break the optical fibre cable and no greater than said first predetermined level.

10. A cable as claimed in claim 4, wherein said reinforcing sleeve comprises aramid fibres.

11. A cable as claimed in claim 4, comprising no more than two optical fibres.

12. A cable as claimed in claim 4, having a substantially circular cross-section.

13. A drop installation including a telecommunications line comprising an optical fibre cable as claimed in claim 4 suspended from a plurality of spaced apart aerial locations.

14. An installation as claimed in claim 13, wherein said telecommunications line comprises a plurality of lengths of said optical fibre cable connected in end-to-end relationship at said aerial locations by respective connection devices, said telecommunications line being secured to each said aerial location by respective securing devices secured to the line at two spaced apart positions such that the portion of the line between said positions is untensioned and includes a said connection device, said securing devices being arranged to permit transmission of a tensile load to a said untensioned portion of the line when a tensile load on the line adjacent thereof on either side of the aerial location reaches a first predetermined level and said connection devices being arranged to cause the end-to-end connection of the lengths of optical fibre cable connected thereby to break when the tensile load transmitted to said untensioned portion reaches a second predetermined amount that is less than a tensile load required to break the optical fibre cable and no greater than said first predetermined level.

15. An optical fibre drop cable, said cable comprising electrical conductors, at least one elongate container for one or more optical fibres, an electrically non-conductive reinforcing sleeve housing said electrical conductors and said at least one elongate container, the reinforcing sleeve comprising strands of electrically non-conductive, aramid fibres helically wound around the electrical conductors and the at least one elongate container, and sheathing for said reinforcing sleeve, the electrical conductors being stranded around said at least one elongate container, and said elongate container being stranded around the electrical conductors,
wherein the electrical conductors are not twisted pair lines,
wherein the reinforcing sleeve is arranged continuously along the entire length of the cable, the sheathing is applied directly on the surface of the reinforcing sleeve, and the sheathing does not contact the electrical conductors and the at least one elongate container,
and wherein said cable is an optical fibre drop cable suitable for suspension installation.

16. An optical fibre drop cable, said cable comprising electrical conductors, at least one optical fibre, an electrically non-conductive reinforcing sleeve housing said electrical conductors and said at least one optical fibre, the reinforcing sleeve comprising strands of electrically non-conductive, aramid fibres helically wound around the electrical conductors and the at least one optical fibre, and sheathing for said reinforcing sleeve, the electrical conductors being stranded around said at least one optical fibre, and said at least one optical fibre being stranded around the electrical conductors,
wherein the electrical conductors are not twisted pair lines,
wherein the reinforcing sleeve is arranged continuously along the entire length of the cable, the sheathing is applied directly on the surface of the reinforcing sleeve, and the sheathing does not contact the electrical conductors and the at least one optical fibre and wherein said cable is an optical fibre drop cable suitable for suspension installation.

17. A cable as claimed in claim 1, wherein the electrical conductors act as power supply wires.

18. A cable as claimed in claim 4, wherein the electrical conductors act as power supply wires.

19. A cable as claimed in claim 2, wherein the plastics tubing is a hollow tube.

20. A cable as claimed in claim 1, wherein said at least one elongate container forms a gas-tight passage for the one or more optical fibres.

* * * * *